United States Patent
Krebs

Patent Number: 5,994,493
Date of Patent: *Nov. 30, 1999

[54] QUICK-SETTING POLYURETHANE HOTMELT ADHESIVE

[75] Inventor: Michael Krebs, Hilden, Germany

[73] Assignee: Henkel Kommanditgeesellschaft auf Aktien, Duesseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/750,262

[22] PCT Filed: May 26, 1995

[86] PCT No.: PCT/EP95/02017

§ 371 Date: Dec. 3, 1996

§ 102(e) Date: Dec. 3, 1996

[87] PCT Pub. No.: WO95/33783

PCT Pub. Date: Dec. 14, 1995

[30] Foreign Application Priority Data

Jun. 3, 1994 [DE] Germany .............................. 44 19 449

[51] Int. Cl.⁶ .................................................. C08G 18/48
[52] U.S. Cl. ......................... 528/79; 528/905; 156/331.4; 525/440; 525/460
[58] Field of Search ..................... 528/79, 905; 525/440, 525/460; 156/331.4

[56] References Cited

U.S. PATENT DOCUMENTS

| | | | |
|---|---|---|---|
| 4,352,858 | 10/1982 | Stanley | 428/423.1 |
| 4,585,819 | 4/1986 | Reischle et al. | 524/196 |
| 5,019,638 | 5/1991 | Müller et al. | 528/83 |
| 5,059,670 | 10/1991 | Harris | 528/48 |
| 5,190,607 | 3/1993 | Werner et al. | 156/331.1 |
| 5,618,904 | 4/1997 | Martin et al. | 528/73 |

FOREIGN PATENT DOCUMENTS

| | | |
|---|---|---|
| 248 658 | 12/1987 | European Pat. Off. . |
| 340 906 | 11/1989 | European Pat. Off. . |
| 354 527 | 2/1990 | European Pat. Off. . |
| 369 607 | 5/1990 | European Pat. Off. . |
| 472 278 | 2/1992 | European Pat. Off. . |
| 511 566 | 11/1992 | European Pat. Off. . |
| 19 30 340 | 1/1971 | Germany . |
| 32 36 313 | 4/1984 | Germany . |
| 40 23 801 | 1/1991 | Germany . |
| 41 29 936 | 3/1992 | Germany . |
| 22 34 516 | 2/1991 | United Kingdom . |
| WO 92/16575 | 10/1992 | WIPO . |

OTHER PUBLICATIONS

Chemical Dictionary, 5th edt., Grant & Hackh's, p. 287; 1987.

*Primary Examiner*—Rachel Gorr
*Attorney, Agent, or Firm*—Ernest G. Szoke; Wayne C. Jaeschke; Stephen D. Harper

[57] ABSTRACT

Reactive hotmelt adhesives based on liquid polyether polyols and/or polyester polyols and aromatic diols with at least one diisocyanate have a very low melt viscosity and high early strength. They are particularly suitable for the bonding of substrates of poor thermal conductivity, such as foams and nonwoven materials, and heat-sensitive substrates.

29 Claims, No Drawings

QUICK-SETTING POLYURETHANE HOTMELT ADHESIVE

FIELD OF THE INVENTION

This invention relates to a quick-setting, moisture-curing polyurethane hotmelt adhesive, to its production and to its use.

DISCUSSION OF RELATED ART

Moisture-curing or moisture-crosslinking polyurethane hotmelt adhesives are adhesives which are solid at room temperature and which are applied in the form of a melt, their polymeric constituents containing urethane groups and reactive isocyanate groups. Cooling of the melt results initially in rapid physical setting of the adhesive followed by a chemical reaction of the isocyanate groups still present with moisture to form a crosslinked, infusible adhesive. It is only after this chemical curing with moisture, accompanied by an increase in the size of the molecule or crosslinking, that the adhesive acquires its final properties. Polyurethane hotmelt adhesives in the narrower sense are solventless adhesives.

The main advantages of hotmelt adhesives over other adhesive systems lies in their very quick setting and in the absence of water and solvents.

Corresponding moisture-curing polyurethane hotmelt adhesives for bonding various substrates are known.

Thus, DE-A-32 36 313 describes a hotmelt adhesive containing a prepolymeric isocyanate, a thermoplastic polymer and a low molecular weight synthetic resin. The prepolymeric isocyanate is a reactive polyurethane prepolymer of an aromatic diisocyanate and/or a prepolymer of this diisocyanate with a short-chain diol and of a polyether or a polyester containing OH groups and a short-chain diol.

This hotmelt adhesive is suitable for the bonding of thermoplastics and thermosets, foams, painted surfaces, rubber, textiles, nonwoven materials, leather, wood, metal and paper. For formulations which are intended to have high initial strengths and to be applied to porous materials, 5 to 40% by weight of the thermoplastic polyurethane has to be added. Unfortunately, this increases the melt viscosity with the result that these adhesives can only be applied by spraying at very high temperatures.

GB-A-2,234,516 describes a moisture-curing hotmelt adhesive consisting of a polyurethane prepolymer A with hard and soft chain segments and terminal isocyanate groups and a urethane prepolymer B with soft chain segments and terminal isocyanate groups. The prepolymer A is prepared in steps from a thermoplastic saturated polyester polyol with a molecular weight of 1,000 to 6,000 and a melting point of 50° C. or higher, a polyol with a molecular weight of not more than 8,000 and a diisocyanate. The prepolymer B is prepared from a polyol with a molecular weight of not more than 8,000 and a diisocyanate. This polyol may be liquid at room temperature or may have a melting point below 50° C. 4,4'-diphenyl methane diisocyanate or toluenediisocyanate is said to be particularly preferred as the diisocyanate. Unfortunately, these hotmelt adhesives require an elaborate production process. Either the prepolymer A and the prepolymer B are prepared in a three-stage process or the polymers have to be prepared in separate two-stage or one-stage processes and subsequently mixed. The melt viscosity of these adhesives at 120° C. is very high (>1 million mPas) so that not only are these adhesives expensive to produce, they are also unsuitable for spray application.

EP-A-340 906 describes a quick-setting polyurethane hotmelt adhesive consisting of a mixture of at least two amorphous polyurethane prepolymers, the two prepolymers having different glass transition temperatures. The first polyurethane prepolymer preferably has a glass transition temperature above room temperature while the second polyurethane prepolymer has a glass transition temperature below room temperature. The polyurethane prepolymer with the higher glass transition temperature preferably consists of a polyester diol and a polyisocyanate while the polyurethane prepolymer with the lower glass transition temperature preferably consists of a linear or lightly branched polyester or of a polyether. Aromatic diisocyanates, such as 4,4'-diphenyl methane diisocyanate or 2,4-tolulenediisocyanate, are said to be preferred diisocyanates. The viscosities of these hotmelt adhesives at 130° C. are in the range from at least 30,000 to 90,000 mPas.

According to EP-B-354 527, hotmelt adhesives can be produced from reaction products of polyisocyanates and hydroxypolyesters, the hydroxypolyesters containing more than 50% by weight of a hydroxypolyester A. The hydroxypolyester A is synthesized from aliphatic diols, optionally ether diols and aliphatic dicarboxylic acids containing 8, 10 or 12 terminal methyl groups. The aliphatic dicarboxylic acids may optionally be partly replaced by aromatic dicarboxylic acids, although in a preferred embodiment at least 50 wt. % of the dicarboxylic acids consist of dodecanedioic acid. The very fast setting rate of these hotmelt adhesives is attributable to their rapid recrystallization in the glueline after application from the melt. Preferred fields of application are said to be the shoe industry, the wood-processing industry, the paper industry and the metal processing industry.

EP-A-369 607 describes quick-setting, moisture-curing polyurethane hotmelt adhesives based on polyurethanes which contain at least one polyether-based prepolymer with a glass transition temperature above room temperature and a second polyurethane prepolymer with a glass transition temperature below room temperature. The second polyurethane prepolymer may be based on an amorphous polyester, a linear or lightly branched polyether or a polybutadiene. Polyols with a molecular weight of, preferably, 250 to 800 and, more preferably, around 400 are proposed for the polyurethane prepolymer with the high glass transition temperature. This results in relatively high isocyanate contents in the final hotmelt adhesive so that it can only be applied in thin layers to avoid foaming under the effect of the carbon dioxide eliminated.

According to EP-A-248 658, polyurethane hotmelt adhesives can be produced from a reaction product of diisocyanates and crystalline polyester diols, the polyester diols having been prepared from symmetrical aromatic dicarboxylic acids and having an acid component of at least 50 mole %. In preferred embodiments, the free isocyanate groups are blocked, for example by acetyl acetone. Although this measure reduces the sensitivity of the hotmelt adhesive to moisture and thus increases stability in storage, the setting rate is significantly increased because the isocyanate group first has to be converted back into its reactive form in a deblocking step in view of the application temperature.

EP-A-472 278 describes an adhesive composition consisting of a polyalkylene ether diol, a polyalkylene ether triol, a polyester polyol and an aliphatic isocyanate compound. The isocyanate compound is preferably a non-aromatic, cyclic or linear aliphatic organic polyisocyanate cyanate with a functionality of 2 to 4 and preferably 2 to 3. The polyalkylene ether diols are, in particular, polytetramethylene ether diol, polyethylene glycol, polypropylene glycol or polybutylene ether diol, the polytetramethylene glycols being preferred. The polypropylene ether triols are preferred for the polyalkylene ether triols. The preferred polyester polyol is a lactone-based polyester polyol, such as polycaprolactone for example, a polycaprolactone triol from the reaction of caprolactone with trimethylol propane being particularly preferred. The effectiveness of this hotmelt adhesive is attributed to the relatively high crystallinity linity of the polyester polyol-based urethane segment. The adhesive composition is suitable for use on fabrics, non-woven materials, wood, metal, leather and plastics. The melt viscosities of the adhesives are not mentioned.

U.S. Pat. No. 4,352,858 describes a modified polyurethane adhesive composition consisting of an isocyanate-terminated prepolymer with a molecular weight of at least 1,000 and 2.5 to 100% by weight, based on the above prepolymer, of a dicarbamate ester reaction product of 2 moles of an organic diisocyanate and 1 mole of a low molecular weight dihydroxy compound such as, for example, ethylene glycol, diethylene glycol, propylene glycol, butane-1,4-diol, etc. The dicarbamate ester has to be subsequently added to the polyurethane prepolymer because it cannot be added during polymerization of the prepolymer. This involves an additional working step which makes the product even more expensive to produce. The lamination of films and packaging materials, the lamination of insulating materials and the production of cushioning for the automotive industry are mentioned as typical applications.

EP-A-511 566 describes a polyurethane hotmelt adhesive of a polyfunctional polyether and/or polyester polyol which is liquid or highly viscous at room temperature, a polyfunctional polyol component with a molecular weight of 500 to 10,000, which is crystalline at room temperature, and a mixture of polyisocyanates. The mixture of the polyisocyanate component contains an isocyanate with two differently reactive isocyanate groups and a diisocyanate with an isocyanate reactivity to hydroxyl groups which is greater than that of the less reactive isocyanate group of the polyisocyanate component containing the two differently reactive isocyanate groups. The polyisocyanate component containing the differently reactive isocyanate groups is preferably 2, 4-toluenediisocyanate or asymmetrically substituted derivatives of diphenyl methane diisocyanate or isophorone diisocyanate. In a preferred embodiment, the second diisocyanate compound is 4,4'-diphenyl methane diisocyanate or hexamethylene diisocyanate. OH-functional polyester polyols, preferably condensation products of adipic acid with butane-1,4-diol or hexane-1,6-diol, are mentioned as the polyol component crystalline at room temperature. Mixtures of OH-functional polyether polyols, for example polypropylene glycols and/or polyethylene glycols, are mentioned as the polyol component which is liquid or highly viscous at room temperature. The high-viscosity hotmelt adhesives are particularly suitable for the bonding of window panes and headlamp diffusors, i.e. glass/plastic composites for the automotive industry. Further particulars of preferred applications are not provided.

Known moisture-curing polyurethane hotmelt adhesives are attended by serious disadvantages which, hitherto, have been an obstacle to economic use in a number of adhesive applications. The properties in need of improvement are inter alia:

The adhesive should be able to be applied at low melt temperatures so that heat-sensitive substrates (polyolefin foams) can be bonded.

The adhesive should have a low viscosity at the application temperatures to ensure that it can also be applied by spraying.

The open time should be readily adjustable to meet customer requirements.

Inexpensive standard polyether polyols or polyester polyols should be able to be used.

The production process should be simple, i.e. the number of components required should be as small as possible.

The product should adhere to many different substrates.

The adhesive bond should be sufficiently strong and yet flexible in use, in addition to which adequate creep strength should be guaranteed.

The viscosity of the molten adhesive should be sufficiently stable during production, packaging and application.

Accordingly, the problem addressed by the present invention was to provide a moisture-curing, quick-setting polyurethane hotmelt adhesive which could be applied by machine, which could be applied by spraying at low temperatures by virtue of its low viscosity, which would have a sufficiently constant melt viscosity and which would be suitable for the bonding of heat-sensitive substrates.

DESCRIPTION OF THE INVENTION

The solution provided by the invention is defined in the claims and lies in a moisture-curing polyurethane hotmelt adhesive terminated by reactive isocyanate groups prepared from a) at least one polyether polyol liquid at room temperature with a number average molecular weight in the range from 500 to 10,000 and/or a polyester polyol liquid at room temperature with a number average molecular weight in the range from 500 to 5,000, b) at least one aromatic polyol with a molecular weight below 1,000, c) at least one diisocyanate, d) optionally catalysts, tackifying resins, stabilizers, pigment pastes and other typical auxiliaries, the stoichiometric ratio of isocyanate groups to the sum of the hydroxyl groups being between 1.03 and 3.5.

A "polyurethane prepolymer" is understood to be an oligourethane containing reactive isocyanate groups which is formed by the reaction of hydroxyfunctional compounds with a more than stoichiometric quantity of polyisocyanates. Polyisocyanates in this context are preferably low molecular weight compounds containing two isocyanate groups, although they may contain up to about 10% by weight of trifunctional isocyanate. However, unwanted crosslinking can be expected to occur with increasing content of trifunctional isocyanate both in the production and in the use of the hotmelt adhesive. In addition to aliphatic and cycloaliphatic polyisocyanates, aromatic polyisocyanates are particularly suitable.

Examples of suitable aromatic polyisocyanates are: any isomers of toluenediisocyanate (TDI) either in the form of pure isomers or in the form of a mixture of several isomers, naphthylene-1,5-diisocyanate, diphenyl methane-4,4'-diisocyanate (MDI), diphenyl methane-2, 4'-diisocyanate and, in particular, mixtures of 4, 4'-diphenyl methane diisocyanate with the 2,4'-isomer, the 2,4'-isomer making up at least lot and preferably at least 40% of the isomer mixture. Examples of suitable cycloaliphatic polyisocyanates are the hydrogenation products of the above-mentioned aromatic diisocyanates, 1-isocyanatomethyl -3-isocyanato-1,5,5-trimethyl cyclohexane (isophorone diisocyanate, IPDI), cyclohexane-1,4-diisocyanate, hydrogenated xylylene diisocyanate ($H_6XDI$), tetramethyl xylene diisocyanate (TMXDI) and dimer fatty acid diisocyanate. Examples of aliphatic polyisocyanates are hexane-1, 6-diisocyanate (HDI), 1,6-diisocyanato-2,2,4-trimethyl hexane, 1,6-diisocyanato-2,4,4-trimethyl hexane, butane-1,4-diisocyanate and 1,12-dodecane diisocyanate ($C_{12}DI$).

An "aromatic polyol" is understood to be an alkoxylation product of an aromatic polyhydroxy compound. These are, in particular, the reaction products of ethylene oxide or propylene oxide with aromatic dihydroxy compounds such as, for example, hydroquinone, resorcinol, pyrocatechol, bis-(hydroxydiphenyl), bisphenol A, bis-phenol F, isomers of dihydroxynaphthalene (pure isomers or a mixture of several isomers), isomers of dihydroxyanthracene (pure isomer or isomer mixture) or isomers of dihydroxyanthraquinone. 1 to 7 alkoxy units have preferably been added per aromatic hydroxy group.

A "polyether polyol" is understood to be a linear polyether containing two OH groups. The preferred polyether polyols correspond to the general formula HO $(-R-O)_m$—H, where R is a hydrocarbon radical containing 2 to 4 carbon atoms. Specific examples of such polyether polyols are polyethylene glycol, polytetramethylene glycol (polyTHF) and, above all, polypropylene glycol (R=—$CH_2CH(CH_3)$—). The polyether polyols may be used both as homopolymers and as copolymers, both as block copolymers and as statistical copolymers. Only one type of polyether polyol is preferably used, although mixtures of 2 to 3 polyether polyols differing in their average molecular weight and/or in the nature of their structural elements may also be used. Small quantities of a trifunctional polyether polyol may also be present in the mixture. The average molecular weight (number average molecular weight) of the polyether polyols is in the range from 500 to 10,000 and preferably in the range from 1,000 to 5,000. The "polyester polyols" suitable for use in accordance with the invention are liquid at room temperature, i.e. their viscosity at 25° C. is below 60,000 mpas, as measured with a Brookfield viscosimeter, the glass transition temperature of the polyester polyol being below 20° C. The glass transition temperature is preferably measured by differential scanning calorimetry (DSC) or by dynamic mechanical thermoanalysis (DMTA). Examples of corresponding polyester polyols are reaction products of dicarboxylic acids, such as glutaric acid, adipic acid, sebacic acid, suberic acid, 3,3-dimethyl glutaric acid, dimer fatty acid, with low molecular weight dihydric alcohols such as, for example, ethylene glycol, propylene glycol, butane-1,4-diol, diethylene glycol, triethylene glycol or dimer fatty alcohol. The suitable polyester polyols may optionally be lightly branched, i.e. small quantities of a tricarboxylic acid or trihydric alcohol have been used in their production.

In one particularly preferred embodiment of the invention, the reactivity of the aromatic polyol is adapted to the reactivity of the polyether polyol or polyester polyol towards the polyisocyanate, so that the reactivity of the hydroxyl groups of the polyether polyol or polyester polyol towards the reactive isocyanate groups is of the same order as that of the hydroxyl groups of the aromatic polyol. The effect of this is that the groups of the aromatic polyol are distributed substantially statistically along the chain of the polyurethane prepolymer. The result of this measure is that no macroscopic domains or incompatibilities are developed in the hotmelt adhesive with the result that the hotmelt adhesive is completely transparent and is suitable, for example, for sealing purposes or assembly bonding with "invisible" joints.

The hotmelt adhesive according to the invention may optionally contain catalysts which accelerate the formation of the polyurethane prepolymer during its production and/or the moisture crosslinking process after application of the hotmelt adhesive. Suitable catalysts are the normal polyurethane catalysts such as, for example, compounds of divalent and tetravalent tin, more particularly the dicarboxylates of divalent tin and the dialkyl tin dicarboxylates and dialkoxylates. Examples of such catalysts are dibutyl tin dilaurate, dibutyl tin diacetate, dioctyl tin diacetate, dibutyl tin maleate, tin(II) octoate, tin(II) phenolate or even the acetyl acetonates of divalent and tetravalent tin. The highly effective tertiary amines or amidines may also be used as catalysts, optionally in combination with the tin compounds mentioned above. Suitable amines are both acyclic and, in particular, cyclic compounds. Examples include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether or dimethyl piperazine or even mixtures of the amines mentioned above.

"Stabilizers" in the context of the present invention are, on the one hand, stabilizers which stabilize the viscosity of the polyurethane prepolymer during its production, storage and application. Suitable stabilizers of this type are, for example, monofunctional carboxylic acid chlorides, monofunctional highly reactive isocyanates and non-corrosive inorganic acids. Examples of such stabilizers are benzoyl chloride, toluene sulfonyl isocyanate, phosphoric acid or phosphorous acid. In addition, stabilizers in the context of the present invention are antioxidants, UV stabilizers or hydrolysis stabilizers. The choice of these stabilizers is determined on the one hand by the main components of the hotmelt adhesive and on the other hand by the application conditions and by the loads to which the bond is likely to be exposed. When the polyurethane prepolymer is predominantly made up of polyether units, antioxidants—optionally in combination with UV stabilizers—are mainly necessary. Examples of suitable antioxidants are the commercially available sterically hindered phenols and/or thioethers and/or substituted benzotriazoles. In cases where key components of the polyurethane prepolymer consist of polyester units, hydrolysis stabilizers, for example of the carbodiimide type, are preferably used.

The hotmelt adhesives according to the invention may optionally contain tackifying resins such as, for example, abietic acid, abietic acid esters, terpene resins, terpene/phenol resins or hydrocarbon resins and also fillers (for example silicates, talcum, calcium carbonates, clays or carbon black), plasticizers such as, for example, phthalates or thixotropicizing agents (for example Bentone, pyrogenic silicas, urea derivatives, fibrillated or pulp chopped fibers) or pigment pastes or pigments.

In one particularly preferred embodiment, a hydroxyfunctional prepolymer containing urethane groups is initially prepared from the aromatic polyol and the polyether polyol or polyester polyol in the first stage of a two-stage reaction with a sluggishly reacting isocyanate such as, for example, TMXDI, IPDI or $H_6XDI$ by ensuring that the total number of hydroxyl groups is present in a stoichiometric excess in relation to the isocyanate groups initially used. This reaction is continued until all the isocyanate groups have reacted off. The remaining hydroxyl groups are then reacted with an aromatic diisocyanate, diisocyanate groups being present in a stoichiometric excess so that an isocyanate-terminated polyurethane prepolymer is formed. An aromatic diisocyanate containing either at least one sterically hindered isocyanate group or two isocyanate groups differing in their reactivity is preferably used for this purpose. Examples of such aromatic diisocyanates are TDI or, in a particularly preferred embodiment, 2,4'-diphenyl methane diisocyanate. The 2,4'-diphenyl methane diisocyanate may be used either as a pure isomer or in admixture with the 4,4'-isomer, in which case the 2,4'-isomer should make up at least 10% and preferably at least 40% by weight of the isomer mixture. The particular advantages of this embodiment are:

- simple production under standard stirring conditions in normal reactors without any gel or fisheye formation occurring, particularly in the second stage,
- the product shows high tackiness and high cohesion,
- the product has a very low viscosity (around 3,000 mPas to around 8,000 mPas at 150° C.),
- by virtue of its low melt viscosity, the hotmelt adhesive can be applied at very low temperatures so that heat-sensitive substrates (for example polyolefin foams) can be bonded; the low viscosity of the polyurethane pre-polymer enables the concentration of the aromatic polyisocyanate used in the second stage to be reduced so that the monomeric isocyanate content of the end product can be significantly reduced. This particular property is of particular advantage in regard to increased safety during the processing of the hotmelt adhesives.

Despite the absence of relatively coarse crystalline domains, the hotmelt adhesive according to the invention surprisingly has a very high setting rate. Through the absence of the crystalline domains, the properties of the hotmelt adhesive can be varied over a broad spectrum:

- short to relatively long open time,
- soft to tough and resilient,
- transparent to pearly white.

It is known that the high setting rate of known hotmelt adhesives is attributable either to rapid crystallization of the crystalline domains of the adhesive or, in the case of amorphous hotmelt adhesives, to the glass-like solidification of the melt. This crystallization has two major disadvantages: firstly, corresponding adhesives are often brittle, particularly at low temperatures, so that they are not suitable for the bonding of flexible substrates. Secondly, the heat of crystallization released during crystallization causes delayed crystallization and hence a distinct reduction in the setting rate in the bonding of substrates with poor thermal conductivity (for example foams). Accordingly, highly crystallizing hotmelt adhesives are unsuitable for the bonding of these substrates.

The hotmelt adhesives based on amorphous polyesters hitherto available as an alternative were also unsuitable for the bonding of corresponding substrates because they could only be applied at very high temperatures in view of their high melt viscosity.

The invention is illustrated by the following Examples in which the quantities shown are parts by weight, unless otherwise indicated.

EXAMPLE 1

38.0 parts of a polypropylene glycol (diol), OH value 56, were introduced into a heatable stirred tank reactor with a vacuum connection and 30.0 parts of a propoxylated bisphenol A, OH value 322, were dissolved therein. Water was then removed in vacuo over a period of 30 minutes at 130° C. until the water content was below 250 ppm. The reactor was then purged with nitrogen, 0.001 part of dibutyl tin dilaurate and 0.05 part of toluene sulfonyl isocyanate were added and the contents of the reactor were stirred for 15 minutes in the absence of a vacuum. 20.607 parts of m-TMXDI were then added and a vacuum subsequently applied. The temperature was slowly increased to 150° C. and the reaction was continued until isocyanate titration produced a value of 0%. The reactor was purged with nitrogen, after which 12.556 parts of MDI (4,4'-/2,4'-isomer mixture in a ratio of about 1:1) were subsequently added and the contents of the reactor were left to react while stirring in vacuo for 30 minutes. 0.2 part of Irganox 1010 (an antioxidant available from Ciba-Geigy) was then added and dissolved with stirring. The reaction product was then transferred to a moisture-proof container at a temperature of at least 140° C. to 150° C. and the container was immediately sealed.

The product had a viscosity of 2,800 mPas at 150° C. (Brookfield viscosimeter). The glass-clear melt solidified after a short time and remained clear, even after solidification. The open time, i.e. the maximum permitted time elapsing between film application of the melt and assembly of the parts to be bonded, was around 5 to 10 seconds, depending on the thickness of the film. With a 50 μm thick film and an application temperature of 150° C., the open time was of the order of 10 seconds. By virtue of this short setting time, the product is eminently suitable for press lamination, for example of automotive parts. The hotmelt adhesive could be effectively applied both by spraying and in bead form. The adhesion properties on the various substrates used, for example, in car construction are shown in Table 1 below.

TABLE 1

| Substrate | Adhesion (qualitative) |
| --- | --- |
| Wood fiber molding material with phenolic resin as binder | Good |
| Wood fiber molding material with epoxy resin as binder | Good |
| Natural fiber molding material with UP resin as binder | Good |
| ABS | Good |
| PCV film | Very good |
| Cotton nonwoven with phenolic resin as binder | Very good |
| Molto (textile/foam composite) | Very good |

The buildup of tensile shear strength over a period of time was measured on wood test specimens (25×10×0.2 mm) stored in a normal climate, application temperature 150° C. (see Table 2):

TABLE 2

| Time [mins.] | Tensile shear strength [MPa] |
| --- | --- |
| 1 | 1.6 |
| 1.5 | 2.8 |
| 1.8 | 3.5 |
| 2.0 | 4.1 |
| 3.4 | 4.6 |
| 6.1 | 4.85 |
| 8.0 | 4.23 |
| 9.5 | 3.8 |
| 11.5 | 4.0 |
| 18.5 | 4.64 |
| 31.5 | 5.32 |

Final strength (after 24 h): 6.5 MPa, substrate failure

EXAMPLE 2

A hotmelt adhesive was prepared from the following components as in Example 1:

| | |
|---|---|
| Propoxylated bisphenol A (OH value 322) | 32.875 parts |
| Polypropylene glycol (OH value 56) | 32.875 parts |
| Irganox 1010 | 0.193 part |
| Toluene sulfonyl isocyanate | 0.049 part |
| Dibutyl tin dilaurate | 0.001 part |
| MDI (mixture of 4,4'- and 2,4'-isomers, ratio 1:1) | 12.522 parts |
| m-TMXDI | 21.485 parts |

Viscosity at 150° C.: 822 mPas, open time at 130° C: <5 seconds, at 170° C: approx. 5 seconds.

Bonding tests between a polyurethane sponge and a nonwoven abrasive cloth of the type used in the manufacture of domestic sponges were carried out with this hotmelt adhesive.

Quantity applied: approx. 40 g/m$^2$, spray application.

Temperature of the hotmelt adhesive: 150° C.

Heat activation by IR lamp.

Pressing of the flexible foam to the nonwoven under a pressure of approx. 3 KPa.

The results are set out in Table 3.

TABLE 3

| Activation time | Temp. immediately after bonding | Pressing time | Temp. before tearing | Result |
|---|---|---|---|---|
| 10 s | 87° C. | 25 s | 81° C. | Pulls threads |
| 7 s | 73° C. | 25 s | 68° C. | Incipient separation |
| 5 s | 65° C. | 25 s | 60° C. | Foam separation |
| 5 s | 65° C. | 15 s | 60° C. | Foam separation |

It can be seen from these simulated practical tests that, even with a very short activation time and a very short pressing time, the hotmelt adhesive is eminently suitable for the bonding of heat-sensitive foam materials with very poor thermal conductivity.

Comparison Example
(Does not Correspond to the Invention)

A prepolymer B and a prepolymer A3 were prepared in accordance with EP-A-369 607.

Prepolymer B 406.3 g of MDI were melted at 40° C. in a closed reactor. 4.3 g of toluene sulfonyl isocyanate and 500 g of polypropylene oxide (molecular weight 400) were added. The reaction was terminated after 30 minutes at 130° C.

Prepolymer A3

800 g of an amorphous polyester of hexane-1,6-diol and a mixture of adipic acid and isophthalic acid, molecular weight 3,500, and 4.6 g of p-toluene sulfonyl isocyanate were introduced into a reactor heated to 80° C., after which 127 g of MDI were added with stirring and the temperature was subsequently kept at 80° C. for 30 minutes and then at 127° C. for 45 minutes.

To produce the hotmelt adhesive, 855 g of prepolymer B were introduced into a reactor at 130° C. and 92.7 g of prepolymer A3 were added with stirring, followed by stirring for 1.5 hours at 130° C. For packing in containers, the temperature had to be increased to 170° C. because the reaction product was too highly viscous to be able to be packed in containers at 130° C. In contrast to EP-A-369 607, a higher percentage isocyanate content was selected for prepolymer B (NCO:OH ratio 1.3:1 instead of 1.181:1) in order the bring the viscosity of the prepolymer into a manageable range.

The viscosity of this hotmelt adhesive was far too high for spray application. According to EP-A-369 607, the tensile shear strength of this comparison adhesive in the bonding of wood is 1.5 mPas, as measured 10 minutes after application.

The Examples clearly show that the hotmelt adhesives according to the invention are distinguished in particular by a very low melt viscosity at relatively low application temperatures and, by virtue of the absence of recrystallization, are eminently suitable for the bonding of substrates of poor thermal conductivity, such as foams for example, show good to very good adhesion on a number of substrates and quickly develop early shear strength.

What is claimed is:

1. A moisture-ring polyurethane hotmelt adhesive composition which is a solid at room temperature, has a viscosity of less than about 8,000 mPas at 150° C., and consists essentially of
   (a) polyurethane prepolymers terminated by reactive isocyanate groups which are the reaction product of:
      (i) at least one polyol liquid at room temperature selected from the group consisting of polyester polyols having a number average molecular weight in the range from about 500 to about 5,000, a viscosity at 25° C. of below 60,000 mPas, as measured with a Brookfield viscometer, and a glass transition temperature below about 20° C., polyether polyols having a number average molecular weight in the range from about 500 to about 10,000 and mixtures thereof;
      (ii) at least one polyol alkoxylation product of at least one aromatic dihydroxy compound, wherein said aromatic dihydroxy compound is selected from the group consisting of bisphenol A, bisphenol F, isomeric dihydroxynaphthalenes, isomeric dihydroxyanthraceneS, isomeric dihydroxyanthraquinones and mixtures thereof, and wherein said alkoxylation product has a molecular weight below 1,000;
      (iii) at least one diisocyanate, wherein the stoichiometric ratio of isocyanate groups to the sum of the hydroxyl groups is between about 1.03 and about 3.5; and
      (iv) optionally, at least one catalyst capable of accelerating formation of the polyurethane prepolymer;
   wherein the reactivity of the polyol alkoxylation product towards the diisocyanate is of the same order as the reactivity of the polyol towards the diisocyanate such that said polyol alkoxylation product is distributed substantially statistically along the chains of the polyurethane prepolymers;
   (b) optionally, at least one tackifying resin;
   (c) optionally, at least one pigment;
   (d) optionally, at least one filler;
   (e) optionally, at least one plasticizer;
   (f) optionally, at least one thixotropicizing agent;
   (g) optionally, at least one stabilizer; and
   (h) optionally, at least one catalyst capable of accelerating moisture-curing of the moisture-curing polyurethane hotmelt adhesive.

2. The hotmelt adhesive of claim 1, wherein at least one polyol is polypropylene glycol.

3. The hotmelt adhesive of claim 1, wherein at least one trifunctional polyether polyol is additionally utilized to form the polyurethane prepolymers.

4. The hotmelt adhesive of claim 1, wherein at least one polyol is a copolymer of propylene oxide and ethylene oxide.

5. The hotmelt adhesive of claim 4, wherein said copolymer of propylene oxide and ethylene oxide is terminated with ethylene oxide groups.

6. The hotmelt adhesive of claim 1, wherein said polyester polyol is difunctional.

7. The hotmelt adhesive of claim 1, wherein said aromatic dihydroxy compound is propoxylated with 1 to 7 propylene oxide units per aromatic hydroxy group.

8. The hotmelt adhesive of claim 1, wherein said diisocyanate has at least one sterically hindered isocyanate group.

9. The hotmelt adhesive of claim 1, wherein said diisocyanate is selected from the group consisting of tetramethyl xylene diisocyanate, 1-isocyanatomethyl-3-isocyanato-1,5,5-trimethyl cyclohexane, isomeric tolylene diisocyanate, 2,4'-diphenyl methane diisocyanate and mixtures thereof.

10. The hotmelt adhesive of claim 1 wherein said diisocyanate is 4,4'-diphenyl methane diisocyanate.

11. The hotmelt adhesive of claim 1 wherein at least 10% by weight, based on the weight of said mixture of diisocyanates, of a diisocyanate having a sterically hindered isocyanate group is present.

12. A process of bonding heat-sensitive substrates or substrates of poor thermal conductivity, comprising contacting said substrates with a moisture-curing polyurethane hotmelt adhesive which is a solid at room temperature, has a viscosity of less than about 8,000 mPas at 150° C., and consists essentially of (a) polyurethane prepolymers terminated by reactive isocyanate groups which are the reaction product of:
   (i) at least one polyol liquid at room temperature selected from the group consisting of polyester polyols having a number average molecular weight in the range from about 500 to about 5,000, a viscosity at 25° C. of below 60,000 mPas, as measured with a Brookfield viscometer, and a glass transition temperature below about 20° C., polyether polyols having a number average molecular weight in the range from about 500 to about 10,000 and mixtures thereof;
   (ii) at least one polyol alkoxylation product of at least one aromatic dihydroxy compound, wherein said aromatic dihydroxy compound is selected from the group consisting of bisphenol A, bisphenol F, isomeric dihydroxynaphthalenes, isomeric dihydroxyanthracenes, isomeric dihydroxyanthraquinones and mixtures thereof, and wherein said alkoxylation product has a molecular weight below 1,000;
   (iii) at least one diisocyanate, wherein the stoichiometric ratio of isocyanate groups to the sum of the hydroxyl groups is between about 1.03 and about 3.5; and
   (iv) optionally, at least one catalyst capable of accelerating formation of the polyurethane prepolymer;
wherein the reactivity of the polyol alkoxylation product towards the diisocyanate is of the same order as the reactivity of the polyol towards the diisocyanate such that said polyol alkoxylation product is distributed substantially statistically along the chains of the polyurethane prepolymers;

(b) optionally, at least one tackifying resin;
(c) optionally, at least one pigment;
(d) optionally, at least one filler;
(e) optionally, at least one plasticizer;
(f) optionally, at least one thixotropicizing agent;
(g) optionally, at least one stabilizer; and
(h) optionally, at least one catalyst capable of accelerating moisture-curing of the moisture-curing polyurethane hotmelt adhesive.

13. The process of bonding of claim 12, wherein said diisocyanate is selected from the group consisting of tetramethyl xylene diisocyanate, 1-isocyanatomethyl-3-isocyanato-1,5,5-trimethyl cyclohexane, isomeric tolylene diisocyanate, 2,4'-diphenyl methane diisocyanate and mixtures thereof.

14. The process of bonding of claim 12, wherein said polyether polyols comprise a copolymer of propylene oxide and ethylene oxide.

15. The hotmelt adhesive of claim 1, wherein said polyol is polypropylene glycol and said aromatic dihydroxy compound is propoxylated with 1 to 7 propylene oxide units per aromatic hydroxy group.

16. The hotmelt adhesive of claim 1, wherein the polyurethane prepolymers are prepared by reacting the polyol and the polyol alkoxylation product with a sluggishly reacting isocyanate selected from the group consisting of TMXDI, IPDI, $H_6$XDI or mixtures thereof with the total number of hydroxyl groups in stoichiometric excess relative to the isocyanate groups to form a first stage reaction product and subsequently reacting the first stage reaction product with an aromatic diisocyanate using a stoichiometric excess of isocyanate groups relative to unreacted hydroxyl groups in the first stage reaction product to form the polyurethane prepolymer.

17. The hotmelt adhesive of claim 16, wherein the aromatic diisocyanate contains either at least one sterically hindered isocyanate group or two isocyanate groups differing in reactivity.

18. The hotmelt adhesive of claim 16, wherein the aromatic diisocyanate is 2,4'-diphenyl methane diisocyanate in pure form or in admixture with 4,4'-diphenyl methane diisocyanate.

19. The hotmelt adhesive of claim 1, wherein the polyol is a polyether polyol having a number average molecular weight in the range from 1,000 to 5,000.

20. The process of claim 12, wherein at least one of the polyols is a polypropylene glycol.

21. The process of claim 12, wherein at least one of the polyols is a copolymer of propylene oxide and ethylene oxide.

22. The process of claim 21, wherein the copolymer is terminated with ethylene oxide groups.

23. The process of claim 12, wherein said aromatic dihydroxy compound is propoxylated with 1 to 7 propylene oxide units per aromatic hydroxy group.

24. The process of claim 12, wherein at least one diisocyanate has at least one sterically hindered isocyanate group.

25. The process of claim 12, wherein at least one diisocyanate is selected from the group consisting of tetramethyl xylene diisocyanate, 1 -isocyanatomethyl-3-isocyanato-1,5,5-trimethyl cyclohexane, isomeric tolylene diisocyanate, 2,4'-diphenyl methane diisocyanate, and mixtures thereof.

26. The process of claim 12, wherein said polyol is polypropylene glycol and said aromatic dihydroxy compound is propoxylated with 1 to 7 propylene oxide units per aromatic hydroxy group.

27. The process of claim 12, wherein the polyurethane prepolymers are prepared by reacting the polyol and the polyol alkoxylation product with a sluggishly reacting isocyanate selected from the group consisting of TMXDI, IPDI, $H_6XDI$ or mixtures thereof with the total number of hydroxyl groups in stoichiometric excess relative to the isocyanate groups to form a first stage reaction product and subsequently reacting the first stage reaction product with an aromatic diisocyanate using a stoichiometric excess of isocyanate groups relative to unreacted hydroxyl groups in the first stage reaction product to form the polyurethane prepolymer.

28. The process of claim 27, wherein the aromatic diisocyanate contains either at least one sterically hindered isocyanate group or two isocyanate groups differing in reactivity.

29. The process of claim 27, wherein the aromatic diisocyanate is 2,4'-diphenyl methane diisocyanate in pure form or in admixture with 4.4'-diphenyl methane diisocyanate.

* * * * *